(12) United States Patent
Breault et al.

(10) Patent No.: US 6,979,509 B2
(45) Date of Patent: Dec. 27, 2005

(54) FREEZE TOLERANT FUEL CELL POWER PLANT WITH A TWO-COMPONENT MIXED COOLANT

(75) Inventors: Richard D. Breault, North Kingstown, RI (US); Patrick L. Hagans, Columbia, CT (US); Jeremy A. Schrooten, Hebron, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 111 days.

(21) Appl. No.: 10/701,987

(22) Filed: Nov. 5, 2003

(65) Prior Publication Data

US 2005/0095475 A1    May 5, 2005

(51) Int. Cl.$^7$ ............................. H01M 8/04; H01M 2/00
(52) U.S. Cl. ............................. 429/26; 429/24; 429/36
(58) Field of Search ............................. 429/24, 26, 34

(56) References Cited

U.S. PATENT DOCUMENTS

| | | | |
|---|---|---|---|
| 5,840,414 A | 11/1998 | Bett et al. | |
| 6,316,135 B1 * | 11/2001 | Breault et al. | 429/22 |
| 6,361,891 B1 * | 3/2002 | Breault et al. | 429/26 |
| 6,528,194 B1 * | 3/2003 | Condit et al. | 429/26 |
| 6,562,503 B2 * | 5/2003 | Grasso et al. | 429/26 |

* cited by examiner

Primary Examiner—Patrick Joseph Ryan
Assistant Examiner—Melissa Austin
(74) Attorney, Agent, or Firm—Malcolm J. Chisholm, Jr.

(57) ABSTRACT

A freeze tolerant fuel cell power plant (10) includes at least one fuel cell (12), a coolant loop (42) having a porous water transport plate (44) secured in a heat and mass exchange relationship with the fuel cell (12) and a coolant pump (46) for circulating a coolant through the plate (44) and for transferring water into or out of the plate (44) with the coolant. A coolant heat exchanger (52) removes heat from the coolant, and an accumulator (66) stores the coolant and fuel cell product water and directs the product water out of the accumulator (66). The coolant is a two-component mixed coolant liquid circulating through the coolant loop (42) consisting of between 80 and 95 volume percent of a low freezing temperature water immiscible fluid component and between 5 and 20 volume percent of a water component.

12 Claims, 2 Drawing Sheets

FREEZE TOLERANT FUEL CELL POWER PLANT WITH A TWO-COMPONENT MIXED COOLANT

TECHNICAL FIELD

The present invention relates to fuel cell power plants that are suited for usage in transportation vehicles, portable power plants, or as stationary power plants, and the invention especially relates to a fuel cell power plant that utilizes a two-component mixed coolant consisting of a large proportion of a water immiscible fluid component mixed with a small proportion of a water component to cool the plant and manage water of the plant.

BACKGROUND ART

Fuel cell power plants are well known and are commonly used to produce electrical energy from hydrogen containing reducing fluid fuel and oxygen containing oxidant reactant streams to power electrical apparatus such as power plants and transportation vehicles. In fuel cell power plants of the prior art, it is known that product water generated by fuel cells of the plant is often managed and removed through porous water transport plates of a coolant system, as well as through evaporation and/or entrainment within a cathode exhaust stream. Such a coolant system is also utilized to provide water through the porous water transport plates to humidify fuel and oxidant reactant streams to thereby minimize drying out of proton exchange membrane ("PEM") electrolytes as well as to remove condensate which occurs within the cell. Porous water transport plates when filled with a liquid also provide gaseous seals to prohibit mixing of the reactant oxidant and fuel streams.

Fuel cell power plants having porous water transport plates, however, give rise to water management difficulties. Total water volume in such plants is very high. Such a high water volume requires complex and costly plant systems, especially when the plant is operated in sub-freezing ambient conditions. For example, mechanical damage may occur when the product water and/or any water coolant fluid freezes without elaborate freeze protection apparatus.

Solutions to such freezing related problems are described in U.S. Pat. No 6,528,194 B1 and U.S. Pat. No. 6,562,503 B2 both of which are entitled "Freeze Tolerant Fuel Cell Power Plant", and both of which are owned by the owner of all rights in the present invention. Those patents disclose the use of water immiscible fluids, as purge fluids, during a shutdown and startup of the plant to displace water from key system components.

When the fuel cell power plant disclosed in those patents is shut down for a short term shut down, displacement valves operate to control flow of the water coolant into a freeze tolerant, open tube accumulator, and the water immiscible fluid into the coolant loop to displace the water coolant to the accumulator. For a long term shut down, the same procedure is undertaken to direct the water coolant into the accumulator; to direct the water immiscible fluid into the coolant loop to displace the water coolant; and, to then drain the water immiscible fluid back into the accumulator.

To start up the power plant after a long term shut down, the water immiscible fluid is first directed to pass from the accumulator through a heater and a re-cycle line to flow through open tubes of the accumulator to melt the frozen water coolant. Whenever fuel cells of the plant have attained a desired operating temperature and the water coolant within the accumulator has thawed, flow of the water immiscible fluid out of the accumulator is terminated, and thawed water coolant is directed to flow through the coolant loop to cool plant fuel cells and manage fuel cell product water. The freeze tolerant fuel cell power plant is then in a steady-state operation wherein the water coolant continues to cycle from the accumulator through the water transport plate of the coolant loop, and back to the accumulator. The displacement or purge of the water coolant by the water immiscible fluid out of the fuel cells and coolant loop prevents mechanical damage to the plant by preventing the freezing of the water coolant during a shutdown and startup, until the water coolant is within the accumulator. Also, the low freezing temperature water immiscible fluid transfers heat from the fuel cells or an external heater to melt frozen coolant water within the accumulator upon start up.

Nonetheless, the prior art has limitations. The prior art fails to rectify the high volume of water in the fuel cell power plant. The high volume of water is a result of two related but separate plant requirements, of first cooling operating fuel cells, and second, managing water within the plant, including fuel cell product water. Consequently, there is a need for a fuel cell power plant that may be efficiently operated in sub-freezing conditions with effective water management and a minimal volume of water.

DISCLOSURE OF INVENTION

The invention is a freeze tolerant fuel cell power plant with a two-component mixed coolant. The plant includes at least one fuel cell for generating electrical current from hydrogen containing reducing fluid fuel and oxygen containing oxidant reactant streams. A coolant loop includes a porous water transport plate secured in a heat and mass exchange relationship with the fuel cells; a coolant pump for circulating a coolant through the plate and for transferring water into or out of the plate with the coolant; a coolant heat exchanger for removing heat from the coolant; a accumulator for storing the coolant and fuel cell product water and for directing the product water out of the accumulator. The coolant is a two-component mixed coolant circulating through the coolant loop. The two-component mixed coolant preferably consists of between 50 and 98 volume percent of a water immiscible fluid component and between 2 and 50 volume percent of a water component. The two-component mixed coolant most preferably consists of between 80 and 95 volume percent of a water immiscible fluid component and between 5 and 20 volume percent of a water component. The water immiscible fluid preferably has a solubility of less than 0.1 percent in water and has a freezing point and a surface tension that are less than water. The water immiscible fluid also most preferably has a freezing point of less than $-10°$ C. and has a surface tension of less than 35 dyne per centimeter.

The freeze tolerant fuel cell power plant of the invention may also include a two-component mixing system. The mixing system includes a coolant diversion valve for selectively directing none, all or a portion of the two-component mixed coolant from the coolant loop to the accumulator; a water immiscible fluid feed valve that selectively directs the flow of the water immiscible fluid from the accumulator into the coolant loop; a suction generating eductor to apply a suction force to the accumulator for withdrawing the water component of the two-component fluid from the accumulator into the coolant loop, and a mixer for mixing the water component from the accumulator with the water immiscible fluid within the coolant loop. The mixing system serves to enhance mixing of the two-component mixed fluid that provides water management and cooling functions during a steady-state operation of the plant.

In an additional preferred embodiment, the freeze tolerant fuel cell power plant may include a plurality of fuel cells cooperatively disposed in a fuel cell stack assembly along with a plurality of porous water transport plates secured in heat and mass exchange relationship with the fuel cells within the cell stack assembly. The cell stack assembly defines a high-volume coolant inlet manifold defined for directing flow of the coolant through the plurality of water transport plates into a coolant exhaust passage. A coolant by-pass line is secured between the high-volume coolant inlet manifold and the coolant exhaust passage. The high-volume coolant inlet manifold is dimensioned to receive and direct to the coolant by-pass line a coolant flow rate that is at least five times a coolant flow rate of coolant flowing through the plurality of water transport plates from the high volume coolant inlet to the coolant exhaust passage. Such a high volume of the two-component mixed coolant flowing through the cell stack assembly enhances mixing of coolant flowing through the plurality of water transport plates.

Accordingly, it is a general purpose of the present invention to provide a freeze tolerant fuel cell power plant with a two-component mixed coolant that overcomes deficiencies of the prior art.

It is a more specific purpose to provide a freeze tolerant fuel cell power plant with a two-component mixed coolant that provides water management and cooling functions during steady-state operation of the plant.

It is yet another purpose to provide a freeze tolerant fuel cell power plant that provides for a minimal volume of product water.

These and other purposes and advantages of the freeze tolerant fuel cell power plant with a two-component mixed coolant will become more readily apparent when the following description is read in conjunction with the accompanying drawings.

DESCRIPTION OF THE PREFERRED EMBODIMENTS

Figure 1:
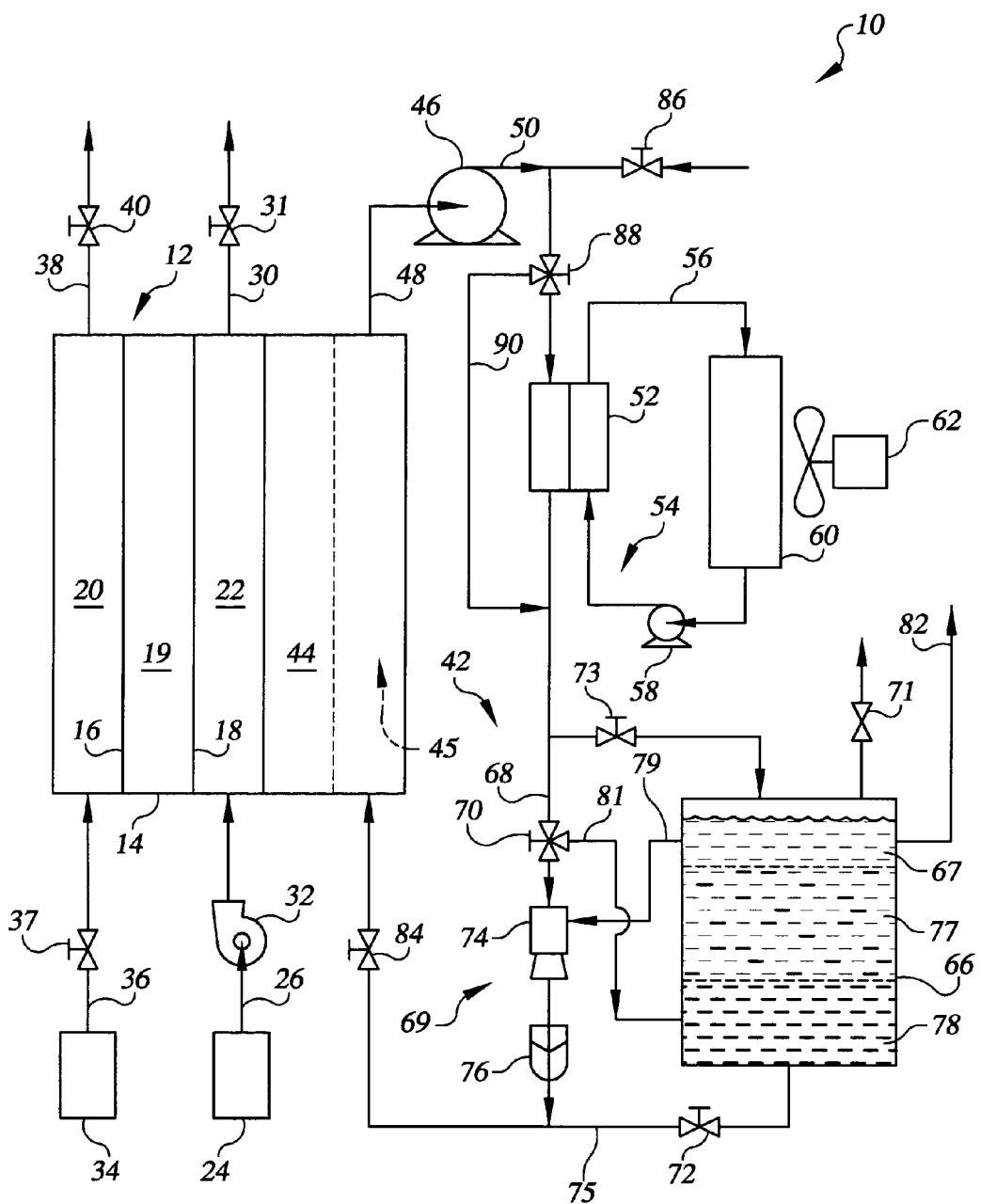
FIG. 1 is a schematic representation of a preferred embodiment of a freeze tolerant fuel cell power plant with a two-component mixed coolant constructed in accordance with the present invention.

Referring to the drawings in detail, a freeze tolerant fuel cell power plant with a two-component mixed coolant of the present invention is shown in FIG. 1, and is generally designated by the reference numeral 10. The power plant 10 includes an electrical current producing fuel cell means for producing electrical current from reducing fluid and process oxidant reactant streams, such as a fuel cell 12. The fuel cell 12 includes a membrane electrode assembly ("MEA") 14, including an anode catalyst 16 and a cathode catalyst 18 secured to opposed sides of an electrolyte 19, such as a well known proton exchange membrane ("PEM"). An anode flow field 20 is defined adjacent to the anode catalyst 16, and a cathode flow field 22 defined adjacent to the cathode catalyst 18. An oxidant supply 24 directs an oxidant, such as air, through an oxidant inlet 26 into the cathode flow field 22 so that the cathode flow field 22 directs the oxidant to flow past the cathode catalyst 18. The oxidant then passes out of the cathode flow field 22 as a cathode exhaust stream into a cathode exhaust passage 30 that directs the cathode exhaust stream to pass out of the fuel cell 12 through an cathode exhaust valve 31.

An oxidant blower 32 may be positioned on the oxidant inlet 26 to direct the oxidant into the cathode flow field 22. A reducing fluid fuel source 34 directs a reducing fluid such as hydrogen gas through a reducing fluid inlet 36 and anode inlet valve 37 into the anode flow field 20, wherein the anode flow field 20 directs the reducing fluid to pass adjacent the anode catalyst 16 and to generate an electrical current in a manner well known in the art. The reducing fluid then passes out of the anode flow field 20 as an anode exhaust stream into an anode exhaust passage 38 that directs the anode exhaust stream to pass out of the fuel cell 12 through an anode exhaust vent 40.

The freeze tolerant fuel cell power plant 10 also includes a primary coolant loop 42 having a water transport plate 44 secured adjacent to the cathode flow field 22 in heat and mass exchange relationship with the fuel cell 12. (The "primary coolant loop 42" may be occasionally referred to herein as the "coolant loop 42".) The water transport plate 44 is a porous plate well known in the art that facilitates movement of water through the porous plate 44 into or out of the fuel cell 12. The water transport plate 44 may also define one or more coolant flow channels, as shown in FIG. 1 at reference number 45, for directing a coolant to flow through the plate 44.

The unique coolant of the present invention is a two-component mixed coolant that preferably consists of between 50 and 98 volume percent of a water immiscible fluid component and between 2 and 50 volume percent of a water component. The two-component mixed coolant most preferably consists of between 80 and 95 volume percent of a water immiscible fluid component and between 5 and 20 volume percent of a water component. The water immiscible fluid preferably has a solubility of less than 0.1 percent in water and has a freezing point and a surface tension that are less than water. The water immiscible fluid also most preferably has a freezing point of less than $-10°$ C. and has a surface tension of less than 35 dyne per square centimeter ("dyne/cm"). The water immiscible fluid must have a surface tension that is substantially lower than the surface tension of water. This results in water, the high surface tension fluid, being preferentially absorbed within the porous structure of the porous water transfer plate 44 and permits the exchange of water into or out of the water transport plate 44 between the cell 12 and the coolant. These surface tension characteristics also maintain bubble pressure characteristics of the water transport plate 44 and prevent leakage of reactant gases into the coolant.

Tests have been done at $20°$ C. with a hydrofluoroether, which is a water immiscible fluid available under the brand name "HFE-7500" manufactured by 3M Specialty Minerals Company of St. Paul, Minn. U.S.A., with a surface tension of 16 dyne/cm versus water with a surface tension of 72 dyne/cm. A porous water transport plate appropriate for use in a fuel cell was saturated with the "HFE-7500" and then immersed in water. The porous water transport plate was treated to make it wettable to water according to a procedure known in the art and as disclosed in a U.S. Pat. No. 5,840,414, which patent is owned by the owner of all rights in the present invention. It was visually observed, and confirmed by mass balances, that the water displaced the water immiscible fluid "HFE-7500" from the porous structure of the water transport plate.

A first preferred water immiscible fluid is selected from the group consisting of perfluorocarbons, hydrofluoroethers, and mixtures thereof that have a freezing temperature that is at least as low as minus forty (−40) degrees Celsius ("° C.") and that are not miscible with water. Suitable perfluorocarbons are perfluoroalkanes, perfluorotrialkylamine and perfluorotributylamine, which are available from the 3M Specialty Minerals Company of St. Paul, Minn. U.S.A. and are sold under the designations of "Grades FC-77, FC-3283, and FC-40" respectively. A suitable hydrofluoroether is sold under the designation "Grade HFE-7500" as identified above. The aforesaid perfluorocarbons are available from the 3M Specialty Minerals Company under the trademark "FLUORINERT PFC", and the suitable hydrofluoroethers are also available from the aforesaid 3M company under the trademark "NOVEC HFE".

A second preferred water immiscible fluid is selected from the group consisting of alkanes, alkenes, alkynes, and mixtures thereof that have a freezing temperature that is at least as low as −40° C. and are not miscible with water. Suitable alkanes include Heptane ($C_7H_{16}$, melting point −91° C.), Octane ($C_8H_{18}$, melting point −57° C.), Nonane ($C_9H_{20}$, melting point −54° C.), and Decane ($C_{10}H_{22}$, melting point −30° C.). Suitable alkenes included Cyclohexene ($C_6H_{10}$, melting point −103° C.), Heptene ($C_7H_{14}$, melting point −119° C.), Cycloheptene ($C_7H_{12}$, melting point −56° C.), Octene ($C_8H_{12}$, melting point −102° C.), Cylooctene (cis) ($C_8H_{14}$, melting point −12° C.), and Cylooctene (trans) ($C_8H_{14}$, melting point −59° C.). Suitable Alkynes include 2-Octyne ($C_8H_{14}$, melting point −62° C.), and 1-Decene ($C_{10}H_{18}$, melting point −36° C.). Many other alkanes, alkenes, alkynes having six or more carbon atoms, or mixtures thereof that have a freezing temperature that is at least as low as −40° C. and that are not miscible with water will also make a suitable water immiscible fluid, such as for example those having multiple double and/or triple bonds. All such alkanes, alkenes, and alkynes and mixtures thereof are available from large chemical suppliers, such as the Aldrich Company, of Milwaukee, Wis. U.S.A.

A third preferred water immiscible fluid is selected from the group consisting of silicon-containing fluids such as: silicones, substituted silicones, siloxanes, polysiloxanes, substituted siloxanes or polysiloxanes and mixtures thereof. Suitable silicon-containing fluids are dimethyl fluids, which are available from the GE company of Bridgeport, Conn. U.S.A. and sold under the designation "SF96 series" or from the DOW company of Midland, Mich. U.S.A. and sold under the designation of Syltherm HF or Syltherm XLT. Suitable polysiloxanes include polyether fluids that are available from the aforesaid GE company and sold under the designation of SF1488 series or SFxx88 series.

The preferred water immiscible fluids may also have surface tensions that are less than or equal to 20 dyne/cm.

The coolant loop 42 also includes a coolant circulating means for circulating the coolant and for transferring water into or out of the plate 44 with the coolant, such as a coolant pump 46 secured between a coolant exhaust passage 48 and a coolant feed passage 50 that pumps the coolant through the coolant feed passage 50, and through a coolant heat exchanger means for removing heat from the coolant, such as a well known coolant heat exchanger 52. Alternatively the coolant heat exchanger means can include a long or serpentine coolant passage 68 secured to the coolant feed passage 50, or any other structure known in the art for removing heat from the coolant. A secondary or antifreeze coolant loop 54 may also be included. The antifreeze coolant loop 54 directs a traditional antifreeze solution, for example ethylene glycol and water or propylene glycol and water to circulate through a antifreeze coolant passage 56, antifreeze coolant pump 58, the coolant heat exchanger 52, an antifreeze coolant radiator 60 adjacent a fan 62, which passes ambient air over the radiator 60 to cool the antifreeze coolant, much like a traditional automobile radiator. This action in turn draws heat out of the two-component mixed coolant flowing through the heat exchanger 52. As is well known, traditional antifreeze solutions would poison the anode and cathode catalysts 16, 18, and by utilizing such traditional antifreeze solutions within a secondary sealed coolant loop 54, the catalysts 16, 18 are protected from exposure to those traditional antifreeze solutions. Use of the antifreeze coolant loop 54 facilitates use of a minimal volume of the unique two-component mixed coolant.

The freeze tolerant fuel cell power plant with a two-component mixed coolant 10 may also include a two-component coolant mixing system 69. The mixing system 69 includes a coolant diversion valve 70 for directing none, all or a portion of the two-component mixed coolant through a diversion valve feed line 81 from the coolant passage 68 of the coolant loop 42 to an accumulator means for storing the coolant and fuel cell product water, and for directing the product water out of the accumulator means. An exemplary accumulator means is a freeze tolerant open tube accumulator 66 such as described in aforesaid U.S. Pat. No. 6,528,194. Alternative accumulator means include all accumulators known in the art that can store the coolant and product water and that can also direct the product water out of the accumulator 66.

The accumulator 66 defines three separate regions, as shown in FIG. 1. First, at reference numeral 67 is a water region; second, at reference numeral 77 is a two-component mixed fluid separation region; and third, at reference numeral 78 is a water immiscible fluid region 78. The accumulator means described above is appropriate for the water immiscible fluid component being denser than the water component. During a steady-state operation, the water component ascends within the accumulator 66 to the water region 67, and the water immiscible fluid descends to the water immiscible fluid region 78 of the accumulator 66, and the two components of the coolant separate within the mixed fluid separation zone 77. However, one skilled in the art could readily construct a accumulator 66 means that utilizes a water immiscible fluid that is less dense than the water component.

Also included in the mixing system 69 is a water immiscible fluid feed valve 72 secured in fluid communication between the coolant passage 68 and the accumulator 66 for selectively directing flow of the water immiscible fluid from the accumulator 66 into the coolant loop 42 through a water immiscible fluid feed line 75.

The mixing system 69 also includes a suction generating means, such as a suction generating pump known in the art (not shown) or an eductor 74, as described in the aforesaid U.S. Pat. No. 6,562,503. An "eductor", also known in the art as an "ejector", as described in U.S. Pat. No. 3,982,961, is a structure that generates a suction force in response to a moving fluid stream passing through the eductor. A water feed line 79 secured in fluid communication with the water region 67 of the accumulator 66 directs the flow of the water component within the accumulator into the eductor 74. Therefore, the eductor 74 generates a suction force within the accumulator 66 withdrawing the water component of the two-component fluid from the accumulator 66 into the coolant loop 42, as the coolant passes through the eductor 74.

Furthermore, the mixing system 69 includes a mixer 76 secured in fluid communication with the coolant loop 42 for mixing the water component with the water immiscible fluid within the coolant loop 42. The mixer 76 may be a static in-line mixer such as those manufactured by Koflo Corporation of Cary, Ill. U.S.A.

The coolant loop 42 may also include a pressure control valve 84 for controlling a pressure of the coolant passing through the water transport plate 44. The pressure control valve 84 would be controlled in a manner well known in the art, as disclosed for example in U.S. Pat. No. 6,316,135 that issued on Nov. 13, 2001, and is owned by the assignee of all rights in the present invention.

Additionally, the freeze tolerant fuel cell power plant 10 may include a mixing system by-pass valve 73 that selectively directs the coolant into the accumulator 66, bypassing the eductor 74 and mixer 76; an accumulator exhaust vent 71, which permits the flow of gases in and out of the accumulator; and an accumulator outlet line 82 secured to the water region 67 for permitting overflow of the water component to pass out of the accumulator 66, and out of the plant 10, or into other plant systems (not shown).

In the preferred embodiment of FIG. 1, during steady-state operation, the diversion valve feed line 81 directs a portion of the coolant from the coolant passage 68 into the water immiscible region 78 of the accumulator 66. The water component of that portion of coolant is separated within the separation region 77 of the accumulator 66 and then directed out of the water region 67 through the water feed line 79 into the eductor 74 resulting in enhanced mixing, while simultaneously directing excess fuel cell 12 product water out of the plant 10 through the accumulator outlet line 82.

During steady-state operation of the freeze tolerant fuel cell power plant with a two-component mixed coolant 10, the two-component mixed coolant cools and facilitates water management of the plant 10. The advantage of the coolant in use with the plant 10 is that the properties of the coolant do not degrade the performance of the anode catalyst 16 nor the cathode catalyst 18 of the fuel cell 12. The coolant operates to remove heat from the coolant loop 42 via the coolant heat exchanger 52. The coolant also provides water for reactant humidification and can also remove condensate and a portion of the product water from the fuel cell 12. Also, the coolant reduces the total product water volume maintained in the plant 10. Thus, the decreased volume of water in the plant 10 improves cold start up of the plant 10 in subfreezing conditions.

During shut down, the cathode exhaust vent 31 and the anode exhaust vent 40 are adjusted in a manner well known in the art to create a pressure differential of approximately 1 to 4 pound per square inch ("psi") (7 to 28 kPa) above ambient ; the coolant diversion valve 70 is adjusted to by-pass the eductor 74 and mixer 76. The coolant passes through the coolant diversion valve 70 and through the diversion valve feed line 81 into the water immiscible region 78 of the accumulator 66. In a preferred embodiment, the coolant may also be circulated at a low speed by the pump 46, wherein the pump 46 is a variable speed pump, for several minutes, which permits the two-component coolant to separate within the coolant loop 42 and accumulator 66. The water component ascends within the accumulator 66 to the water region 67, and the water immiscible fluid component descends to the water immiscible fluid region 78 of the accumulator 66, and the two components of the coolant separate within the mixed fluid separation region 77. Then the water immiscible fluid is directed through the water immiscible feed valve 72 into the coolant loop 42 and results in the water immiscible fluid displacing water from the fuel cell 12 and coolant loop 42. The coolant pump 46 is then shut off and coolant diversion valve 70 is closed. A drain vent valve 86 to the coolant loop 42 is opened and coolant drains into the accumulator 66 through the coolant passage 68 and mixing-system by-pass valve 73. Then the cathode exhaust vent 31 and anode exhaust vent 40 are controlled to set the reactant pressures to ambient pressure completing the shut down.

During start up from a subfreezing condition reactants are provided to the fuel cell 12 at a pressure of approximately 1 psi or greater; an electrical load is connected in a manner known in the art; and the drain vent valve 86 is closed and the water immiscible feed valve 72 is open. The coolant circulation preferably starts when the fuel cell temperature is above freezing, preferably between 30 degrees Celsius ("° C.") and 40° C. Alternatively the coolant may be heated by a heater (not shown) and the coolant may be supplied to the fuel cell 12 prior to connecting an electrical load (not shown) or simultaneously with applying the electrical load. The cathode exhaust vent 31 and the anode exhaust vent 40 are adjusted in a manner known in the art to create back pressure and thereby facilitate movement of product water out of the fuel cell 12 and into the water transport plate 44; and full operation of the plant 10 can be initiated. During start up, the coolant diversion valve 70 is closed and the mixing system by-pass valve 73 is open resulting in the warm coolant flowing through open tubes (not shown) of the accumulator 66 and melting the frozen water component of coolant in the accumulator 66, in a manner disclosed in the aforesaid U.S. Pat. No. 6,528,194 B1. Once the frozen water component is melted, the mixing system by-pass valve 73 is closed and the coolant diversion valve 70 is adjusted to the steady-state operation setting described above providing for parallel flow of the coolant through the accumulator 66 and mixing system 69. The coolant loop 42 may also include a heat exchange by-pass valve 88 in fluid communication with a heat exchange-by-pass line 90 that by-passes the radiator during start up and directs the coolant through the coolant passage 68 to minimize heat loss in the water immiscible fluid to thereby hasten melting of the frozen water component in the accumulator 66.

Figure 2:
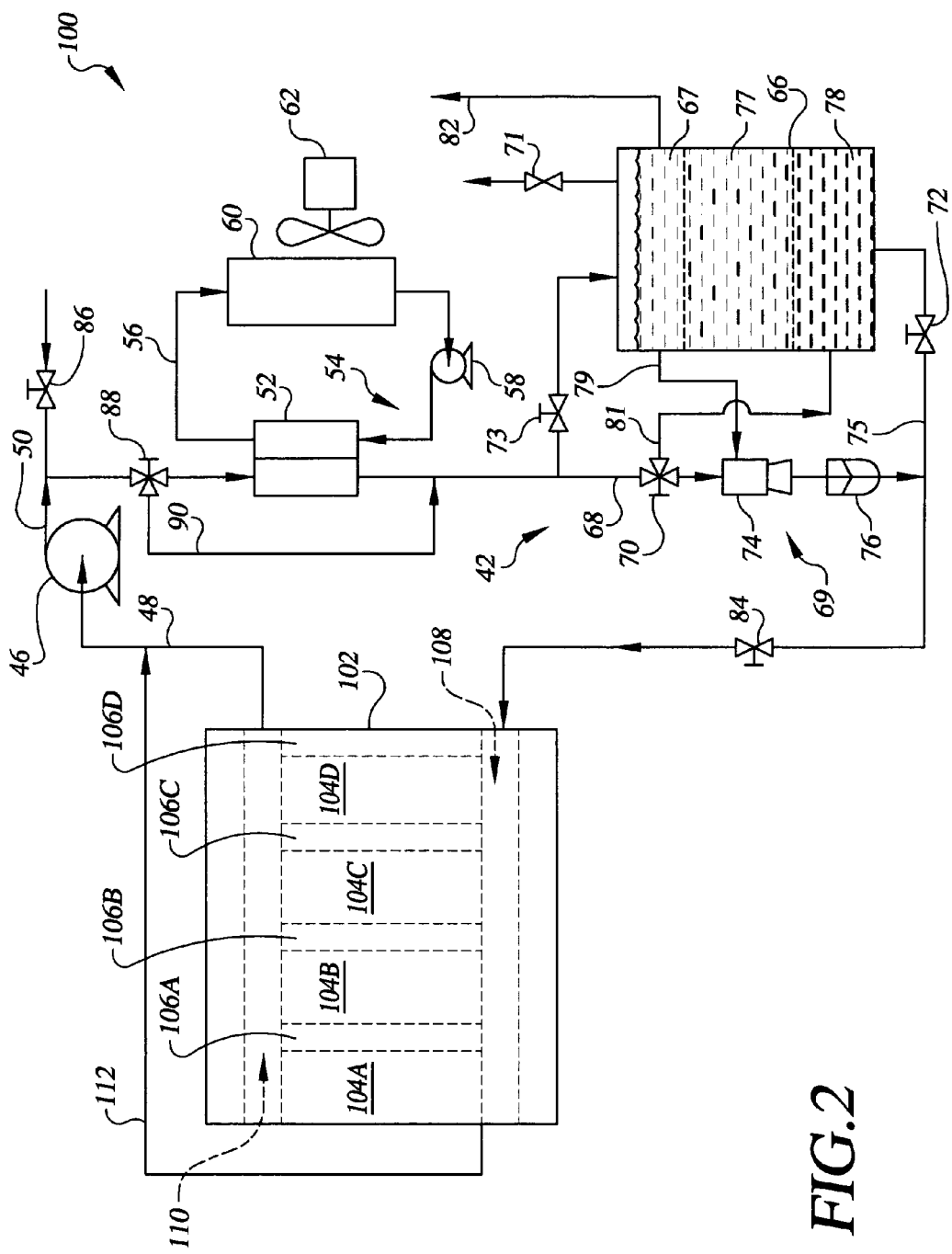
FIG. 2 is a schematic representation of an alternative embodiment of a freeze tolerant fuel cell power plant with a two-component mixed coolant containing a cell stack assembly having a plurality of fuel cells and a plurality of coolant flow fields for directing flow of coolant through the cell stack assembly constructed in accordance with the present invention.

A further embodiment 100 of the present invention is shown in FIG. 2. The FIG. 2 embodiment of the power plant 100 contains a cell stack assembly 102 having a plurality of fuel cells 104A, 104B, 104C, 104D that are cooperatively disposed in a well known manner in the fuel cell stack assembly 102 along with a plurality of water transport plates 106A, 106B, 106C, 106D that are also secured in heat and mass exchange relationship with the fuel cells 104A, 104B, 104C, 104D within the cell stack assembly 102. The cell stack assembly 102 of the present invention defines a high-volume coolant inlet manifold 108 for directing flow of the coolant through the plurality of water transport plates 106A, 106B, 106C, 106D into a coolant outlet manifold 110, and then into the coolant exhaust passage 48. A coolant by-pass line 112 is secured between the high-volume coolant inlet manifold 108 and the coolant exhaust passage 48. The high-volume coolant inlet manifold 108 is dimensioned to receive and direct to the coolant by-pass line 112 a coolant flow rate that is at least five time a coolant flow rate of coolant flowing through the plurality of water transport plates 106A, 106B, 106C, 106D from the high-volume coolant inlet manifold 108 to the coolant exhaust passage 48. Such a high volume of the two-component mixed coolant flowing through the cell stack assembly 102 enhances mixing of coolant flowing through the plurality of water transport plates 106A, 106B, 106C, 106D and ensures that some water is provided to each water transport plate 106A, 106B, 106C, 106D to provide reactant humidification.

The steady-state, shut down, and start up of the second embodiment, as shown in FIG. 2, would be as described for the first embodiment shown in FIG. 1 and described above.

The plant 10, as shown in FIGS. 1 and 2, includes the antifreeze coolant loop 54, having a large radiator 60. The radiator 60 is secured in heat exchange relationship with the coolant passing through the coolant heat exchanger 52. This construction minimizes the volume of water immiscible fluid that is required because much of the cooling of the plant 10 is done by the antifreeze coolant loop 54 and its large radiator 60. Minimizing the volume of the water immiscible fluid is important if the water immiscible fluid is expensive, such as a hydrofluoroether. The freeze tolerant fuel cell power plant with a two-component mixed coolant 10, may also include an auxiliary heater (not shown) to heat the coolant, as shown in the aforesaid U.S. Pat. No. 6,528, 194 B1. However, for certain requirements, no auxiliary heater is required.

It can be seen that the freeze tolerant fuel cell power plant of the present invention efficiently cools and facilitates water management of the plant 10 through use of its unique two-component mixed coolant. In particular, the coolant minimizes the volume of water within the plant 10. The reduction of the volume of water helps enhance steady-state, shut down, and start up processes.

The patents referred to above are hereby incorporated herein by reference.

While the present invention has been described and illustrated with respect to a particular construction of a freeze tolerant fuel cell power plant with a two-component mixed coolant 10, it is to be understood that the invention is not to be limited to the described and illustrated embodiments. For example, in a steady-state operation, a fuel recycle line (not shown) and an oxidant recycle line (not shown) can be used, as described in U.S. Pat. No. 6,361,891, which is owned by the owner in the present invention. Such a fuel recycle line and an oxidant recycle line are used to heat and humidify incoming reactants in an advantageous manner known in the art. Accordingly, reference should be made primarily to the following claims rather than the foregoing description to determine the scope of the invention.

What is claimed is:

1. A freeze tolerant fuel cell power plant (10) for generating an electrical current from hydrogen containing reducing fluid fuel and oxygen containing oxidant reactant streams, the plant comprising:
   a. at least one fuel cell (12) having a proton exchange membrane electrolyte (19);
   b. a coolant loop (42) including a porous water transport plate (44) secured in heat and mass exchange relationship within the fuel cell (12), a coolant circulating means (46) secured to a coolant passage (68) in fluid communication with the porous water transport plate (44) for circulating a coolant through the plate (44) and for transferring water into or out of the plate (44) with the coolant, coolant heat exchanger (52) means secured to the coolant passage (68) for removing heat from the coolant, an accumulator (66) means secured in fluid communication with the coolant passage (68) for storing the coolant and water; and,
   c. wherein the coolant is a two-component mixed coolant circulating through the coolant loop (42), the two-component mixed coolant consisting of a water immiscible fluid component and a water component.

2. The freeze tolerant fuel cell power plant (10) of claim 1, wherein the two-component mixed coolant consists of between 50 and 98 volume percent of a water immiscible fluid component and between 2 and 50 volume percent of a water component.

3. The freeze tolerant fuel cell power plant (10) of claim 1, wherein the two-component mixed coolant consists of between 80 and 95 volume percent of a water immiscible fluid component and between 5 and 20 volume percent of a water component.

4. The freeze tolerant fuel cell power plant (10) of claim 1, wherein the water immiscible fluid is selected from the group consisting of silicones, substituted silicones, siloxanes, polysiloxanes, substituted siloxanes or polysiloxanes and mixtures thereof.

5. The freeze tolerant fuel cell power plant (10) of claim 1, wherein the water immiscible fluid is selected from the group consisting of perfluorocarbons, hydrofluoroethers and mixtures thereof.

6. The freeze tolerant fuel cell power plant (10) of claim 1, wherein the water immiscible fluid is selected from the group consisting of alkanes, alkenes, alkynes having six or more carbon atoms and mixtures thereof.

7. The freeze tolerant fuel cell power plant (10) of claim 1, wherein the water immiscible fluid has a freezing temperature equal to or less than minus ten degrees Celsius and has a surface tension of less than or equal to 35 dynes/cm.

8. The freeze tolerant fuel cell power plant (10) of claim 1 further comprising a two-component coolant mixing system, including:
   a. a coolant diversion valve (70) for selectively directing none, all or a portion of the two component mixed coolant to flow from the coolant loop (42) to the accumulator (66) means;
   b. a water immiscible fluid feed valve (72) secured in fluid communication between the coolant loop (42) and the accumulator (66) means for selectively directing flow of the water immiscible fluid from the accumulator (66) means into the coolant loop (42);
   c. a suction generating means (74) secured in fluid communication between the coolant loop (42) and the accumulator (66) means for applying a suction force to the accumulator (66) means for withdrawing the water component of the two-component fluid from the accumulator (66) means into the coolant loop (42); and,
   d. a mixer (76) secured in fluid communication with the coolant loop (42) for mixing the water component with the water immiscible fluid within the coolant loop (42).

9. The freeze tolerant fuel cell power plant (10) of claim 8, further comprising a mixing system by-pass valve (73) secured in fluid communication with the coolant passage (68) that selectively directs the coolant from the coolant passage (68) into the accumulator (66) by-passing the mixing system (69).

10. The freeze tolerant fuel cell power plant (10) of claim 1, further comprising:
   a. a plurality of fuel cells (104A, 104B, 104C, 104D) cooperatively disposed in a fuel cell stack assembly (102);
   b. a plurality of porous water transport plates (106A, 106B, 106C, 106D) secured in heat and mass exchange relationship with the fuel cells (104A, 104B, 104C, 104D) within the cell stack assembly (102);

c. a high-volume coolant inlet manifold (108) defined within the cell stack assembly (102) for directing flow of the two-component mixed coolant through the plurality of water transport plates (106A, 106B, 106C, 106D) into a coolant exhaust passage (48) of the coolant loop (42);

d. a coolant by-pass line (112) secured between the high-volume coolant inlet manifold (108) and the coolant exhaust passage (48); and, e. wherein the high-volume coolant inlet manifold (108) is dimensioned to receive and direct to the coolant by-pass line (112) a coolant flow rate that is at least five times a coolant flow rate of coolant flowing through the plurality of water transport plates (106A, 106B, 106C, 106D) from the high volume coolant inlet manifold (108) to the coolant exhaust passage (48) to enhance mixing of the two-component mixed coolant flowing through the cell stack assembly (102).

11. The freeze tolerant fuel cell power plant of claim 1, further comprising an antifreeze coolant loop (54) for circulating an antifreeze coolant through an antifreeze coolant passage (56), an antifreeze coolant pump (58), the coolant heat exchanger (52), and an antifreeze coolant radiator (60), for removing heat from the coolant heat exchanger (52) and the antifreeze coolant.

12. The freeze tolerant fuel cell power plant (10) of claim 1, further comprising a heat-exchange by-pass valve (88) secured in fluid communication with the coolant passage (68) and with a heat-exchange by-pass line (90) for selectively directing the coolant to by-pass the heat exchanger (52) and flow back into the coolant passage (68).

* * * * *